Patented Jan. 9, 1951

2,537,131

UNITED STATES PATENT OFFICE 2,537,131

CONTINUOUS PROCESS FOR THE PREPARATION OF ALKYLATED ALKYLOL MELAMINE

Adrian Jacques Grossman, New York, N. Y., assignor to American Cyanamid Company, New York, N. Y., a corporation of Maine No Drawing. Application July 18, 1947, Serial No. 761,996

6 Claims. (Cl. 260—249.6)

This invention relates to a continuous process for the production of alkylated alkylol melamines; and, specifically, the invention is directed to a continuous liquid phase process for the production of methylated methylol melamines.

The prior art process for the production of alkylated alkylol melamines comprises the production of the alkylol melamine. This intermediate was reduced to the dry state, which was then alkylated under acid conditions on a batch size basis, and concentrated to the desired or required viscosity. According to the teachings of this invention, a continuous process, simple in operation and in equipment, is provided which will be economical through the elimination of several steps of production and the necessity of employing dry intermediates, increase the rate of production, reduce the amount of handling, reduce operating costs, and also reduce the alkylating agent requirements.

The foregoing advantages of this invention are attained by charging a predetermined ratio of melamine and an aqueous aldehyde solution into a heat exchanger under conditions of continuous flow, to effect the addition reaction for an alkylol melamine which is combined with an alcohol containing a catalyst to effect alkylation of the alkylol melamine and passed into a second heat exchanger; the complete process being under conditions of continuous flow. The resulting solution may then be buffered, vacuum concentrated, filtered and collected.

This continuous process may be conveniently divided or separated into two stages, i. e., (1) the preparation of the alkylol melamine syrup, and (2) the alkylation of the alkylol melamine syrup. The additional step involving buffering, filtering, concentrating and collecting are not critical or essential phases of the invention.

The purpose of the first stage is to form an alkylol melamine resin with a maximum combining ratio, and a minimum degree of polymerization. The two fundamental variables, therefore, are the ratio of formaldehyde to melamine and the degree of reaction. The degree of reaction is conveniently determined by the temperature, the pH and the length of time that the product is reacted in the first heat exchanger, which period of time may be conveniently referred to as "holding time." The combined ratio of aldehyde to melamine in the final product will vary directly with the ratio of formaldehyde to melamine of the starting slurry. There will be, of course, a slight decrease in the combining ratios over the starting ratios. Such decrease usually varies from about 0.2 to about 0.3 mol of aldehyde per mol of melamine when preparing trialkylol melamines or other ratios substantially in this proportion. When preparing the higher ratio resins, such as the penta-alkylol melamines, the drop in combining ratio is slightly larger than in the lower ratio resins, and, accordingly, a higher percentage or excess of aldehyde should be employed in the starting materials. The pH, of course, is controlling as to the rate of reaction. With substantially low pH conditions, such as 1.7, the rate of reaction is too fast to be easily controlled, and should be avoided in favor of pH within the range of 6 to 7 where the rate is not too critical.

The variables of holding time and temperature of reaction considered as one factor, may be called "the degree of reaction." It is found that this is the primary factor in determining the type of resin which is formed. This degree of reaction may be controlled by either long holding time at high temperatures such as 6.2 minutes at 220° F. to give a resin just short of hydrophobic; or a short holding time at a low temperature such as 1.9 minutes at 207° F. to give a resin as nearly monomeric as possible without precipitation of the monomer from solution. Variations of these two variables will give any desired degree of reaction and type of resin. The effect of this reaction rate on the combined aldehyde-melamine ratio of the final product is noticeable in that a holding time of 3½ minutes at a temperature of either 215° F. or 235° F., with a starting material ratio of 3.3 mols of formaldehyde per mol of melamine, yields a product having superior combining ratios than reactions employing a holding time of 1.9 minutes at 207° F., 215° F. or 235° F. There is, however, no apparent choice between using 215° F. or 235° F. when a holding time of 3.5 minutes is employed in this reaction. With higher temperatures and long periods of reaction, the combining ratio is higher, but the degree of reaction is too high to permit much latitude in the second stage of the process.

The general effect of this reaction rate in the first stage of the process was studied, wherein the degree of reaction was increased up to the stage when a hydrophobic resin occurred. This hydrophobic resin occurred when a temperature of 250° F. was used with a starting material of 3.3 mols of formaldehyde per mol of melamine. It was found that when a low degree of reaction is employed, that is a reaction of short duration at a low temperature, drastic conditions which were difficult to control were required during the alkylation stage or second step, in order to produce a satisfactory final product. When a high degree of reaction was employed, that is a long reaction at a high temperature, the most gentle secondary reaction or alkylation stage resulted in a hydrophobic product. With a compromise in reaction conditions, the widest latitude was obtained in the second stage of the process, and furthermore, the stability of the product showed a marked improvement. Hence, compromise between the least possible degree of reaction and the highest possible degree of reaction, appears to be both beneficial to the combining ratios and stability of final product to produce best results with less limitations in the final product. In general, the first stage of the process is not extremely critical as long as the product is not so far reacted or nearly hydrophobic as to so nearly limit the second stage of the process.

The second stage of the invention also is critical with respect to the degree of reaction, since the degree of reaction determines the per cent completion of the alkylation reaction. If the degree of reaction is too low, insufficient alkylation is obtained, and the product has poor stability. If the reaction is too high, the product is hydrophobic, and can not be used for many applications. The optimum degree of reaction lies, therefore, somewhere inbetween. There are three mutually interdependable variables; they are: the pH of the reaction, the temperature of the reaction, and the holding time. The degree of reaction is increased by decreasing the pH, raising the temperature, and increasing the holding time. Therefore, the optimum degree of reaction may be obtained by a large number of combinations of these three mutually interdependent factors. All feasible variations have been tried. At any given holding time, the degree of reaction may be increased by raising the temperature, lowering the pH or both; and, conversely, the degree of reaction may be decreased by raising the pH, lowering the temperature or both.

In studying the critical nature of this second stage of the process of this invention, several different holding times were maintained, and at each holding time the temperature and pH was varied so that products obtained covered the range between those insufficiently alkylated due to too low a degree of reaction, and those polymerized due to too great a degree of reaction. Thus, both optimum conditions and maximum-minimum limits were determined for each holding time, as well as optimum conditions with respect to the variable, holding time.

With a holding time in the second stage of this continuous reaction of 1.3 minutes, the best products were obtained with a pH of 6.5 when a temperature of 212° F.-222° F. was used, this representing the optimum degree of reaction. An equivalent degree of reaction was obtained at a pH of 6.0 if lower temperatures were used, but pH became difficult to control below this point, and the reaction became too critical to be feasible at lower pH's. An equivalent product was also obtained at a pH of 7.0 with higher temperature, but, at this pH the reaction appears to be too critical, that is, a slight variation of conditions results in a great difference in product. At pH values above 7, little, if any, reaction appears to take place, as all attempts resulted in either the formation of very large precipitate or solid white gel. When the holding time was increased to 2.6, a pH of 7.0 and a temperature of 212° F.-217° F. were required to obtain a satisfactory product. However, when the holding time was increased to 5 minutes, the same conditions, i. e., a pH of 7.0 and a temperature of 212°-217° F. gave the optimum satisfactory products for this holding time. When, however, the holding time is increased to 7.4 minutes a much lower temperature must be used in order to obtain satisfactory products. The optimum conditions at this holding time are a pH of 6.3 at a temperature of 147° F., or comparable results were obtained with a pH of 6.5-7.0 when the temperature was 160° F. A series of tests at this holding time indicated that with a given pH, satisfactory products may be obtained at a given optimum temperature. However, a variation of 15° F. on either side of the optimum temperature will produce a useless product for most utilities; that is, i. e., the degree of reaction will be either too low or too great. Within the limitations of pH 6.0 to 7.0, the pH does not appear to be of such a critical nature. In all cases, however, optimum conditions are required to obtain good per cent alkylation and when per cent alkylation is above 45%, the stability of the product improves as the per cent alkylation increases. When longer holding times are used, the reaction appears to be less critical, and, therefore, more easily controlled. However, equal per cent methylation stability can be obtained at holding times varying from 1.3-7.4 minutes. In all cases, optimum conditions are required, to obtain best per cent methylation.

From a standpoint of reproducibility of products by this continuous process, and the standardization of all parts of the product by the continuous process, the first stage and the second stage can be duplicated, and the step of adjusting the pH of the final products, filtering and concentrating, is, of course, always reproducible and is not responsible for any variations in the product. There are various methods suitable for this final collection of the product, each method having slight variations. They are as follows: the effect of buffering, the effect of vacuum concentration, the continuous method of vacuum concentration, and spray drying. The pH of the alkylated alkylol melamine obtained from the reaction is usually between 6.0 and 7.5. This pH must be raised to approximately 8.5-9.5 in order to preserve the syrup, which is preferably buffered to prevent the pH from falling. The pH may be adjusted by adding to the product, as it leaves the final heat exchanger, one of the following: sodium hydroxide, triethanolamine, diethyl ethanolamine, sodium bisulfite, sodium sulfite, boric acid, and a mixture of boric acid and potassium chloride in equimolecular proportions. Of course, combinations of these buffers may be employed. The product may be satisfactorily concentrated by batch vacuum concentration or continuous vacuum concentration employing a continuous flash evaporation process or other suitable procedures.

In order to illustrate the invention, the procedure with respect to equipment and specific examples will be given in connection with the preparation of methylated trimethylol melamine; it being clearly understood, however, that the invention is not so limited, as satisfactory products are obtained with other alkylating agents, and with other aldehyde-melamine reaction intermediates in various proportions.

The equipment is not limited to that specifically described hereinbelow, as various modifications may be made to provide equipment suitable for obtaining the desired effect and control conditions for the continuous process described herein. A satisfactory arrangement of equipment suitable for continuous flow comprises a storage tank, equipped with lightning agitators, so positioned as to receive a metered quantity of an aqueous formaldehyde solution from a storage tank and a metered quantity of melamine from a storage bin. The storage tank equipped with the agitators effects a homogeneous slurry of a predetermined quantity of formaldehyde and melamine, which slurry, at an adjusted pH, is metered by positive displacement pumps at a predetermined rate of flow into the first heat exchanger under pressure. The holding time in this heat exchanger may be varied by the rate of feed or by changing the length of the exchanger by suitable valves. This heat exchanger is steam jacketed having a control therefor such that the temperature may be varied within any desired feasible range. The formaldehyde and melamine are reacted under continuous flow in this first heat exchanger to the desired degree by controlling the reaction time and temperature. The trimethylol melamine prepared in the heat exchanger is cooled continuously in a heat exchanger, and piped to a second unit where it is combined with acidified methanol. This acidified methanol is pumped from storage under pressure by a positive displacement pump. The mixture then passes into a second heat exchanger, in which the heating time of the mixture may be varied by changing the length of the exchanger by suitable manipulation of valves to include or bypass certain sections of the exchanger. This heat exchanger is also steam jacketed, and the temperature may be controlled within any desired feasible range. The product methylated trimethylol melamine is cooled in a cold water jacket heat exchanger to prevent flashing when the pressure is released. This pressure of the entire system may be controlled by a needle valve at the discharge end of the continuous equipment. The methylated trimethylol melamine may then be buffered, concentrated and collected in any of the aforementioned methods.

As a typical example of the flow of a portion of material in the continuous process, a quantity of aqueous formaldehyde solution previously adjusted in pH with sodium hydroxide is metered and pumped to the storage vessel along with a metered quantity of melamine, wherein the two are thoroughly mixed; the quantity of melamine and formaldehyde solution being such as to provide 3.3 mols of formaldehyde per mol of melamine. This slurry is pumped at a predetermined rate, under pressure, through the first heat exchanger, preferably being such to provide a temperature of 215° F., and a holding time therein of 3.5 minutes; the holding time being defined as the "time required for any given quantity in continuous flow to pass completely through the heat exchanger." The resulting trimethylol melamine having an average combined ratio of 3.0 mols of formaldehyde per mol of melamine is then mixed with methanol, which has previously been acidified with a quantity of oxalic acid sufficient to provide .5 to .7% acid based on the weight of methanol. The methanol is pumped under pressure at a predetermined rate sufficient to provide 2 parts of methanol per part of trimethylol melamine. This mixture is then directed through a second heat exchanger, preferably maintained at a temperature of 140° F., and of sufficient size to require 7.4 minutes for any given quantity of the mixture to pass therethrough. The methylated trimethylol melamine product continuously flowing from said second heat exchanger is continuously adjusted with sodium hydroxide to a pH of 8.5–9.5, and vacuum concentrated to a viscosity of 1290 to 1760 centipoises in a flash evaporator. The mixture obtained in this manner is filtered in a filter press before storing. The distillate from the flash evaporator is directed through a stripping unit with the recovered methanol being directed to the methanol storage, and the water having impurities is discarded. The following specific examples illustrate some of the variations and specific descriptions of the process:

*Example 1*

A slurry containing 3.3 molecular equivalents of formaldehyde and 1 molecular equivalent of melamine, adjusted to a pH of 6.3 was pumped through a heat exchanger at a temperature of 215° F. at a rate such that any quantity of the slurry was subjected to this temperature for 3.5 minutes. The resulting methylol melamine was continued in flow and admixed with methanol containing 0.5% oxalic acid, fed at a rate sufficient to provide approximately 10 mols of methanol per mol of trimethylol melamine. This mixture, while still under continuous flow, was directed through a heat exchanger at 147° F. at a rate such that any quantity required 7.4 minutes to pass through said heat exchanger. The pH of the solution, passing through this heat exchanger, was 6.3. The resulting methylated trimethylol melamine emanating from the second heat exchanger was adjusted in pH to 9.0, flash evaporated to a viscosity of 1290 to 1760 centipoises, and filtered.

The above experiment was repeated with the initial charge varying from 3.3 to 3.6 mols of formaldehyde per mol of melamine with the reaction time in the first heat exchanger varying from 1.9 minutes to 6.2 minutes, and the temperature varying from 207° F. to 235° F. The second stage of the reaction was varied with a methanol addition varying from 7 to 14 molecular equivalents per molecular equivalent of resin, and the oxalic acid content varying from 0.04 to 0.75%, and the second heat exchanger was varied with a holding time from 1.3 to 7.4 and a temperature from 130° F.–320° F. with the pH of the mixture varying from 5.4 to 7.6.

The combined formaldehyde-melamine ratio of the first stage product appears to vary directly with the starting ratio. However, with a ratio of 3.3:1, 3.45:1 and 3.6:1, there appears to be no advantage of one over the other. For optimum results, a holding time in the first stage of 5 minutes at a temperature of 215° F.–235° F. appeared to give a product having superior combining ratios than products with other degrees of reaction. There appeared to be no noticeable difference between the products at 215° F. and 235° F. with a holding time of 3.5 minutes. Furthermore, products with this degree of reaction gave the widest latitude of the control conditions of the secondary reaction, or methylation stage. Accordingly, for optimum results, these conditions are recommended. The optimum conditions for the second stage of the continuous process, namely: the methylation stage, a holding time of 7.4 minutes was found the most desirable from a control viewpoint, and at this holding time, a temperature of 147° F. could be used with a reaction mixture having a pH of 6.3. By raising the pH to 6.5 to 7.0, the optimum temperature was found to be 160° F. No great advantage was obtained by employing high ratios of methanol. The 7 mols of methanol per mol of trimethylol melamine gave substantially the same results as the 14 mols of methanol per mol of trimethylol melamine. There was, however, a slight increase in per cent methylation, but not sufficient to warrant the excessive amount of alcohol.

The above experiments were also tested with respect to a satisfactory buffering agent to be used in adjusting the pH of the final product to approximately 9.0. Satisfactory results were obtained with practically all compounds tested, among which may be mentioned: triethanolamine, diethyl ethanolamine, sodium bisulfite, sodium sulfite, boric acid, and a mixture of boric acid and potassium chloride in equimolecular proportions. The preferred buffer is equimolecular proportions of boric acid and potassium chloride, with the close second choice being the organic buffers.

A series of tests were run in which the proportions and control conditions were maintained constant for several groups of five separate and distinct runs of the continuous process in each group. The products obtained in each of the separate and distinct operations of the continuous process were identical with those of the other four operations conducted under the same conditions. Therefore, the process lends itself to complete reproducibility of desired product. It was further noted that all particles of any one particular operation was the same as the other particles of that particular operation. This type of reproducibility experiments were conducted with fifteen different ratios of starting materials, and control conditions. Although two samples from the same run will duplicate each other, and runs conducted under the same control conditions will duplicate each other, the properties of any one run will vary from those of another run at different control conditions.

When greater ratios of reactants are employed, such as is the case in the production of pentamethylol melamine, and the alkylated derivatives thereof, it is preferable to employ lower temperatures and shorter holding times. For example, when the starting materials are present in the proportion of approximately 5 mols of formaldehyde per mol of melamine, the degree of reaction for satisfactory results in the first stage varied from 1.5 minutes at 115° C. to 4.9 minutes at 90° C. Comparable reduced temperature and time for optimum degree of reaction, appear to pertain in the methylation of these compounds.

I claim:

1. A continuous process for the production of alkylated alkylol melamines comprising reacting an aqueous solution of aldehyde and melamine at 207° F. to 235° F. for 1.9 to 6.2 minutes to effect an addition reaction, and reacting the addition product with acidified alcohol at a temperature of from about 147° F. to 235° F. for from 1.3 minutes at the higher temperature to 7.4 minutes at a lower temperature at a pH of from about 6 to 7 to effect alkylation, and said reactions being effected under conditions of liquid phase continuous flow.

2. A continuous process for preparing methylated trimethylol melamine comprising reacting approximately 3.3 to 3.6 molecular equivalents of formaldehyde in aqueous solution and one molecular equivalent of melamine at 215° F. to 235° F. for approximately 3½ minutes, and reacting the resultant addition compound with acidified methanol for 7.4 minutes at 147° F. and a pH of 6.3, said reactions being effected under conditions of liquid phase continuous flow.

3. A continuous process for the production of methylated methylol melamines reacting aqueous formaldehyde and melamine at 207° F. to 235° F. for 1.9 to 6.2 minutes to effect an addition reaction, and reacting the addition product with acidified methanol at a temperature of from about 147° F. to 235° F. for from 1.3 minutes at the higher temperature to 7.4 minutes at the lower temperature at a pH of from about 6 to 7 to effect alkylation, and said reactions being effected under conditions of liquid phase continuous flow.

4. A continuous process for preparing methylated trimethylol melamine comprising reacting approximately 3.3 to 3.6 molecular equivalents of formaldehyde in aqueous solution and one molecular equivalent of melamine at 215° F. to 235° F. for approximately 3½ minutes, and reacting the resultant addition product with methanol containing 0.5% oxalic acid for 7.4 minutes at 147° F. and a pH of 6.3, said reactions being effected under conditions of liquid phase continuous flow.

5. A continuous process for the production of methylated methylol melamines comprising reacting aqueous formaldehyde and melamine at 207° F. to 235° F. for 1.9 to 6.2 minutes to effect an addition reaction, reacting the addition product with acidified methanol at a temperature of from about 147° F. to 235° F. for from 1.3 minutes at the higher temperature to 7.4 minutes at the lower temperature at a pH of from about 6 to 7 to effect alkylation, and said reactions being effected under conditions of liquid phase continuous flow, and buffering and vacuum concentrating the methylated methylol melamine solution.

6. A continuous process for preparing methylated trimethylol melamine comprising reacting an aqueous neutral solution of approximately 3.3 to 3.6 molecular equivalents of formaldehyde and one molecular equivalent of melamine at 215° F. to 235° F. for approximately 3½ minutes, reacting the resultant addition compound with acidified methanol for 7.4 minutes at 147° F. and a pH of 6.3, said reactions being effected under conditions of liquid phase continuous flow, buffering the resultant methylated trimethylol melamine solution, and concentrating the solution to a viscosity of 1200 to 1800 centipoises.

ADRIAN JACQUES GROSSMAN.

REFERENCES CITED

The following references are of record in the file of this patent:

UNITED STATES PATENTS

| Number | Name | Date |
|---|---|---|
| 1,660,403 | Turkington | Feb. 28, 1928 |
| 1,895,945 | Semon | Jan. 31, 1933 |
| 2,197,357 | Widmer | Apr. 16, 1940 |
| 2,329,622 | Johnstone | Sept. 14, 1943 |
| 2,387,547 | Widmer | Oct. 23, 1945 |
| 2,433,802 | West | Dec. 30, 1947 |
| 2,454,078 | McGrew | Nov. 16, 1948 |
| 2,454,495 | Widmer | Nov. 23, 1948 |

FOREIGN PATENTS

| Number | Country | Date |
|---|---|---|
| 230,861 | Great Britain | 1926 |

OTHER REFERENCES

British Plaste, Feb. 1943, pages 508–520.